United States Patent
McBride et al.

(10) Patent No.: US 7,472,227 B2
(45) Date of Patent: Dec. 30, 2008

(54) INVALIDATING MULTIPLE ADDRESS CACHE ENTRIES

(75) Inventors: Chad B. McBride, Rochester, MN (US); Andrew H. Wottreng, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 351 days.

(21) Appl. No.: 11/201,971

(22) Filed: Aug. 11, 2005

(65) Prior Publication Data

US 2007/0038797 A1  Feb. 15, 2007

(51) Int. Cl.
*G06F 12/00* (2006.01)

(52) U.S. Cl. .................. 711/133; 711/135; 711/156; 711/206; 711/207

(58) Field of Classification Search .............. None
See application file for complete search history.

(56) References Cited

U.S. PATENT DOCUMENTS

| 4,682,281 | A * | 7/1987 | Woffinden et al. | 711/207 |
| 6,684,315 | B2 * | 1/2004 | James et al. | 711/210 |
| 7,188,215 | B2 * | 3/2007 | Hooker | 711/118 |

* cited by examiner

*Primary Examiner*—Reginald G. Bragdon
*Assistant Examiner*—Shawn X Gu
(74) *Attorney, Agent, or Firm*—Dugan & Dugan

(57) ABSTRACT

In a first aspect, a first method is provided for removing entries from an address cache. The first method includes the steps of (1) writing data to a register; and (2) removing a plurality of address cache entries from the address cache based on the data written to the register. Numerous other aspects are provided.

7 Claims, 3 Drawing Sheets

INVALIDATING MULTIPLE ADDRESS CACHE ENTRIES

FIELD OF THE INVENTION

The present invention relates generally to computer systems, and more particularly to methods and apparatus for invalidating multiple address cache entries.

BACKGROUND

A memory of a computer system may include a table including a mapping of input/output (I/O) addresses and real addresses to enable translation between the input/output and real addresses. The computer system may include an address cache (e.g., a translation lookaside buffer (TLB)) for locally storing frequently accessed entries from the translation table.

Upon completion of an I/O operation, one or more entries in the translation table and TLB may need to be invalidated. Conventional methods and apparatus for invalidating TLB entries are costly because they adversely affect system performance since they require an invalidation operation for each address cache entry. Further, another method of snooping all memory writes to a translation table and then invalidating corresponding address cache entries requires a large amount of chip real estate. Accordingly, improved methods and apparatus for invalidating address cache entries are desired.

SUMMARY OF THE INVENTION

In a first aspect of the invention, a first method is provided for removing entries from an address cache. The first method includes the steps of (1) writing data to a register; and (2) removing a plurality of address cache entries from the address cache based on the data written to the register.

In a second aspect of the invention, a second method is provided for removing entries from a data cache. The second method includes the steps of (1) writing data to a register; and (2) removing a plurality of data cache entries from the data cache based on the data written to the register.

In a third aspect of the invention, a first apparatus is provided for removing entries from an address cache. The first apparatus includes logic, including a register, adapted to couple to the address cache and further adapted to (1) store data written to the register; and (2) remove a plurality of address cache entries from the address cache based on the data written to the register.

In a fourth aspect of the invention, a first system is provided for removing entries from an address cache. The first system includes (1) a processor adapted to execute software; (2) an address cache; and (3) an apparatus for removing entries from the address cache having logic, including a register, coupled to the processor and address cache. The system is adapted to (a) write data to the register; and (b) remove a plurality of address cache entries from the address cache based on the data written to the register. Numerous other aspects are provided in accordance with these and other aspects of the invention.

Other features and aspects of the present invention will become more fully apparent from the following detailed description, the appended claims and the accompanying drawings.

DETAILED DESCRIPTION

The present invention provides methods and apparatus for removing (e.g., by invalidating) address cache entries, which avoid the costs associated with conventional systems. More specifically, the present invention provides methods and apparatus for removing multiple (e.g., consecutive) address cache entries. A register may be employed to store an address that indicates a first address cache entry to be removed, a count indicating a number of address cache entries (e.g., including the first address cache entry) to be removed, and an invalidation state bit that prevents software (e.g., the operating system (OS) of the computer system) from employing address cache entries which are being removed. Logic coupled to the register may be employed to remove a number of address cache entries corresponding to consecutive addresses including the first address cache entry, as required. Once complete, the logic may update the invalidation state bit to indicate to the system (e.g., to the OS) that removal of entries in the address cache is complete. Thus, subsequently performed I/O operations will not access an address cache entry including inaccurate data. In this manner, the present invention may reduce an amount of logic required to remove address cache entries and reduce a number of software commands necessary to remove address cache entries. Thus, the present invention provides methods and apparatus for removing address cache entries without the costs associated with conventional systems.

Figure 1:
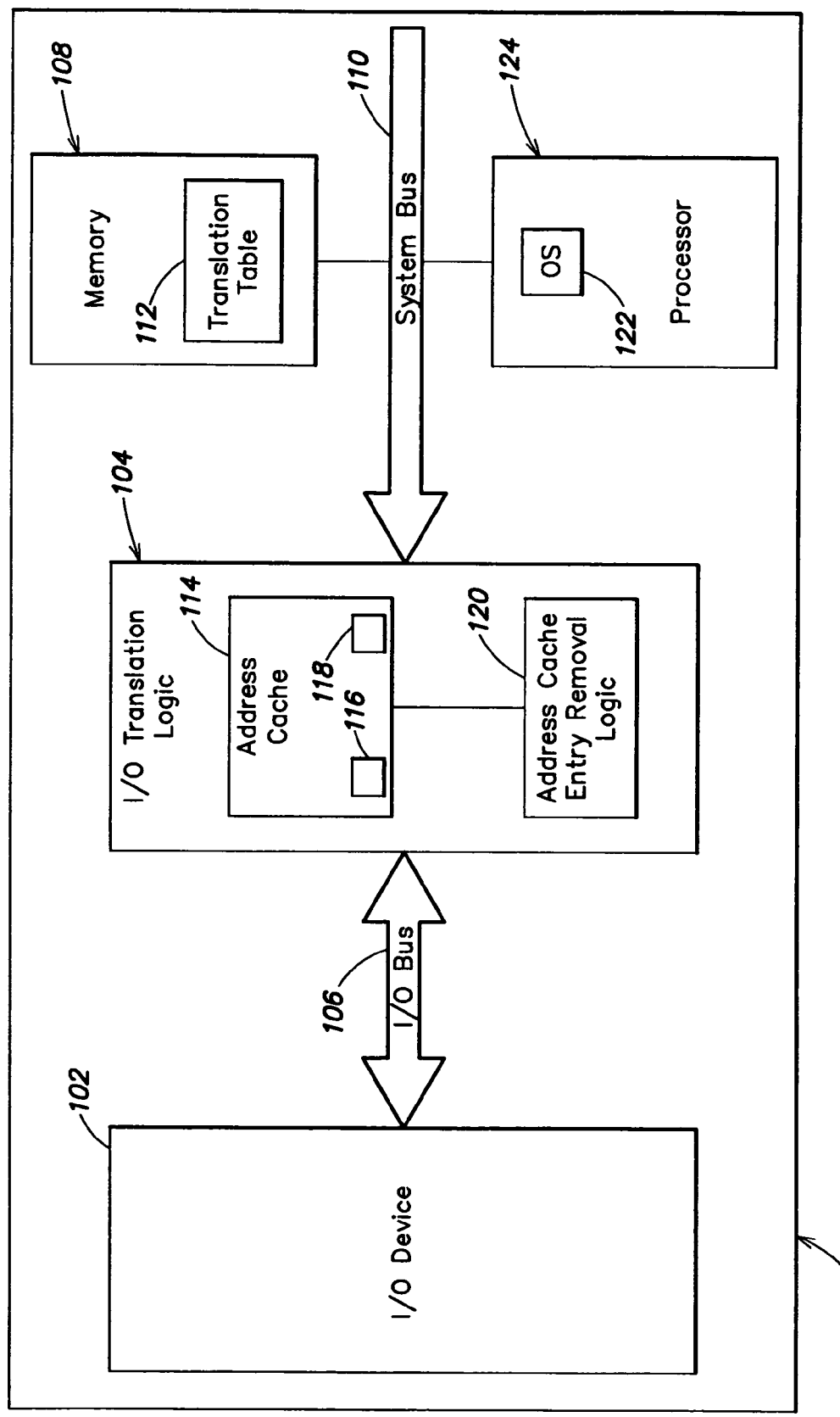
FIG. 1 is a block diagram of a system for removing address cache entries in accordance with an embodiment of the present invention.

FIG. 1 is a block diagram of a system 100 for removing address cache entries in accordance with an embodiment of the present invention. The system 100 may form part of a computer or similar device, for example. With reference to FIG. 1, the system 100 may include one or more I/O devices 102 (only one shown) adapted to couple to and communicate with I/O translation logic 104 via an I/O bus 106. The I/O translation logic 104 may store and/or retrieve data employed to translate an I/O address to a real address. The I/O translation logic 104 may couple to and communicate with a memory 108 (e.g., a DRAM or another suitable memory) via a system bus 110. The memory 108 may include a translation table 112 adapted to store I/O addresses and respective real addresses associated therewith. In this manner, the translation table 112 may translate an I/O address to a real address and vice versa during a memory access, for example, by the I/O device 102. Because the translation table 112 may be large (e.g., 8 MB) and one or more I/O devices 102 may frequently access information in the translation table 112 via the I/O translation logic 104, the I/O translation logic 104 may include an address cache 114 adapted to store frequently accessed translation table entries locally. Consequently, while performing an I/O operation, rather than retrieve address translation data from the translation table 112 (e.g., via the system bus 110), the system 100 may retrieve such data from the address cache 114. The address cache 114 may include a directory array 116 and a data array 118. The directory array 116 may include entries storing address cache directory information associated with corresponding address cache data entries in the data array 118. In some embodiments, the address cache 114 may be a translation lookaside buffer (TLB) or another suitable storage area. In one embodiment, the address cache 114 may include sixty-four entries (although a larger or smaller number of entries may be employed).

Once an I/O operation (e.g., a memory access by an I/O device 102) is performed, data translation entries from the translation table 112 and/or the address cache 114 may be removed. Therefore, the system 100 may include address cache entry removal logic (hereinafter "ACER") 120 coupled to and/or included in the I/O translation logic 104. More specifically, the ACER 120 may couple to the directory array 116 of the address cache 114. The ACER 120 may be adapted to remove one or more entries from the address cache 114 based on data written to the ACER 120, for example, by software, such as the system OS. For example, based on data written to the ACER 120, the ACER 120 may remove a plurality of address cache entries corresponding to consecutive addresses. More specifically, the ACER 120 may set a bit (e.g., a valid bit) associated with an address cache entry so that the bit indicates the address cache entry is invalid. In this manner, the system 100 (e.g., software executed thereby) may remove a plurality of entries from the address cache 114 without invalidating the entire address cache 114. Further, the system 100 may remove the plurality of entries from the address cache 114 with a single instruction (e.g., by writing data to the ACER 120) rather than employing a plurality of instructions to remove the plurality of address cache entries, respectively. In this manner, the ACER 120 may efficiently remove address cache entries. Details of the ACER 120 are described below with reference to FIG. 2.

Figure 2:
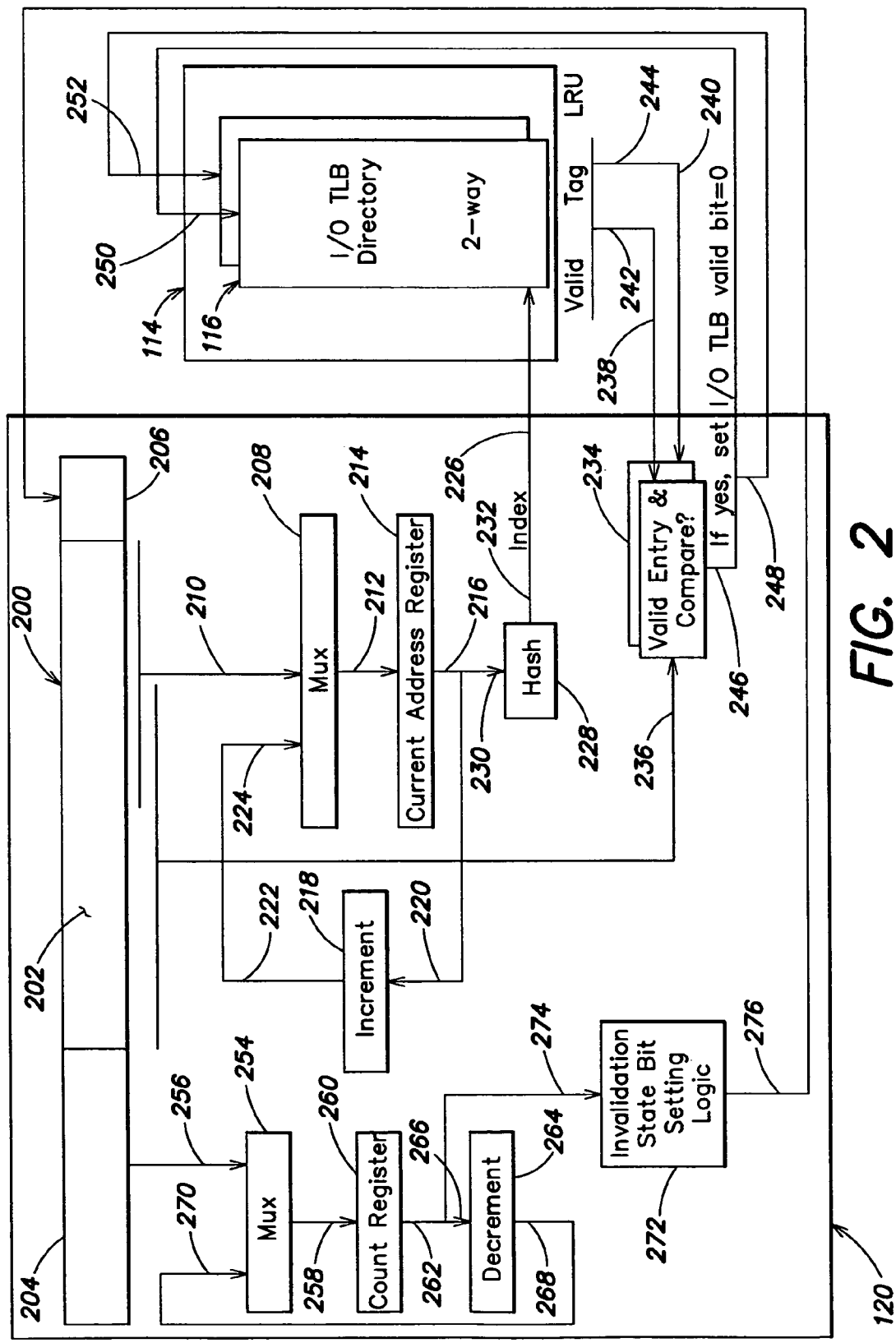
FIG. 2 is a block diagram of address cache entry removal logic included in the system for removing address cache entries in accordance with an embodiment of the present invention.

FIG. 2 is a block diagram of address cache entry removal logic included in the system for removing address cache entries in accordance with an embodiment of the present invention. With reference to FIG. 2, as stated, the ACER 120 may couple to the directory array 116 of the address cache 114. The ACER 120 may include an address cache entry invalidate register (hereinafter "invalidate register") 200 adapted to store data. For example, the invalidate register 200 may store first data 202 indicating an address of a first address cache entry to be removed from the address cache 114. A first portion of the address may be used to index the address cache 114 and thereby access address cache entries, and a second portion of the address may be employed to determine whether accessed address cache entries match the entry identified by a second portion of the first data 202. The invalidate register 200 may store second data 204 indicating a number of entries to be removed from the address cache. Further, the invalidate register 200 may store third data 206 indicating a state of the address cache entry removal. In this manner, the third data 206 may serve as an invalidation state bit.

The invalidate register 200 may be coupled to a first multiplexer 208 such that the first portion of the first data 202 (e.g., address) may be input by the first multiplexer 208 via a first input 210. An output 212 of the first multiplexer 208 may be coupled to a second register 214 adapted to store the data (e.g., an address) output from the first multiplexer 208. In this manner, the second register 214 may store an address to be removed from the address cache 114. An output 216 of the second register 214 may be coupled to increment logic 218 via an input 220. The increment logic 218 may be adapted to increment an input address to a next valid address and output the incremented address via an output 222.

The output 222 of the increment logic 218 may be coupled to a second input 224 of the first multiplexer 208 such that the incremented address may be input by the first multiplexer 208. The first multiplexer 208 may be adapted to selectively output data input by the first or second input 210, 224 of the first multiplexer 208. For example, during a first time period (e.g., one or more clock cycles), the first multiplexer 208 may initially output the first portion of the first data 202. During a subsequent time period, the first multiplexer 208 may output data representing the first portion of the first address cache entry address incremented by the increment logic 218 to form a second address cache entry address (e.g., the incremented address). Similarly, during a subsequent time period, the first multiplexer 208 may output data representing a first portion of the second address cache entry address incremented by the increment logic 218 to form a third address cache entry address.

The output 216 of the second register 214 may serve as an index to the directory array 116 of the address cache 114. For example, the output 216 of the second register 214 may be coupled to a first input 226 of the directory array 116 and serve to output information from the directory array 116 based on such input. Alternatively, the output 216 of the second register 214 may be coupled to hashing logic 228 via an input 230 thereof. An output 232 of the hashing logic 228 may be coupled to the first input 226 of the directory array 116. The hashing logic 228 may be adapted to convert data input by the hashing logic 228 to a value (e.g., an index) that may be used to access the directory array 116 and output such value via the output 232. To convert data input by the hashing logic 228 to an index, the hashing logic 228 may perform a logic EXCLUSIVE-OR (XOR) operation or another suitable logic operation.

The ACER 120 may include compare logic 234 coupled to the invalidate register 200 and the address cache 114. More specifically, a first input 236 of the compare logic 234 may be coupled to the invalidate register 200 such that the second portion of the first address may be input by the compare logic 234. Further, additional inputs of the compare logic 234 (e.g., a second and third input 238, 240) may be coupled to corresponding outputs 242-244 of the address cache 114. The compare logic 234 may include one or more outputs (e.g., a first and second output 246, 248) coupled to corresponding inputs (e.g., a second and third input 250, 252) of the address cache 114 (e.g., the directory array 116 of the address cache 114). The compare logic 234 may be adapted to compare the second portion of the first address input via the first input 236 with respective data (e.g., address data) input via the second and third inputs 238, 240. If data input via the second or third input 238, 240, which correspond to address cache entries, matches the data input by the first input 236, the compare logic 234 may output data to the address cache 114 via the output 246, 248 corresponding to the matching entry. Such data may serve as a value of a valid bit for the matching entry so that the valid bit indicates the matching address cache entry is invalid. In this manner, an address cache entry may be removed.

The ACER 120 may be adapted to increment data output by the second register 214 while reading data from the address cache 114, comparing data output from the address cache 114 with the first portion of the first data 202 and/or writing data to the address cache 114 (although the ACER 120 may increment data output by the second register 214 sooner or later).

Further, the invalidate register 200 may be coupled to a second multiplexer 254 such that the second data 204 may be input by the second multiplexer 254 via a first input 256. An output 258 of the second multiplexer 254 may be coupled to a third register 260 adapted to store the data (e.g., a value indicating a number of entries to be removed from the address cache 114) output from the second multiplexer 254. An output 262 of the third register 260 may be coupled to decrement logic 264 via an input 266 thereof. The decrement logic 264 may be adapted to decrement (e.g., by one) an input value (e.g., the value indicating the number of entries to be removed from the address cache 114) and output the decremented value via an output 268. The ACER 120 may be adapted to decrement data output from the third register 260 while incrementing data output by the second register 214 (although the ACER 120 may decrement data output from the third register sooner or later).

The output 268 of the decrement logic 264 may be coupled to a second input 270 of the second multiplexer 254 such that the decremented value may be input by the second multiplexer 254. The second multiplexer 254 may be adapted to selectively output data input by the first or second input 256, 270 of the second multiplexer 254. For example, during the first time period (e.g., one or more clock cycles), the second multiplexer 254 may initially output the second data 204. During a subsequent time period (e.g., the second time period), the second multiplexer 254 may output data representing the second data decremented by one. Similarly, during a subsequent time period (e.g., the third time period), the second multiplexer 254 may output data representing the second data decremented by two, and so on.

The third register 260 may be coupled to invalidation state bit setting logic 272. More specifically, an output 262 of the third register 260 may be coupled to an input 274 of the invalidation state bit setting logic 272. The invalidation state bit setting logic 272 may detect when output 262 has a zero value. An output 276 of the invalidation state bit setting logic 272 may be coupled to the invalidate register 200 such that data (e.g., the zero value) output by the invalidation state bit setting logic 272 may update the third data 206 to indicate that removal of one or more address cache entries is complete.

Figure 3:
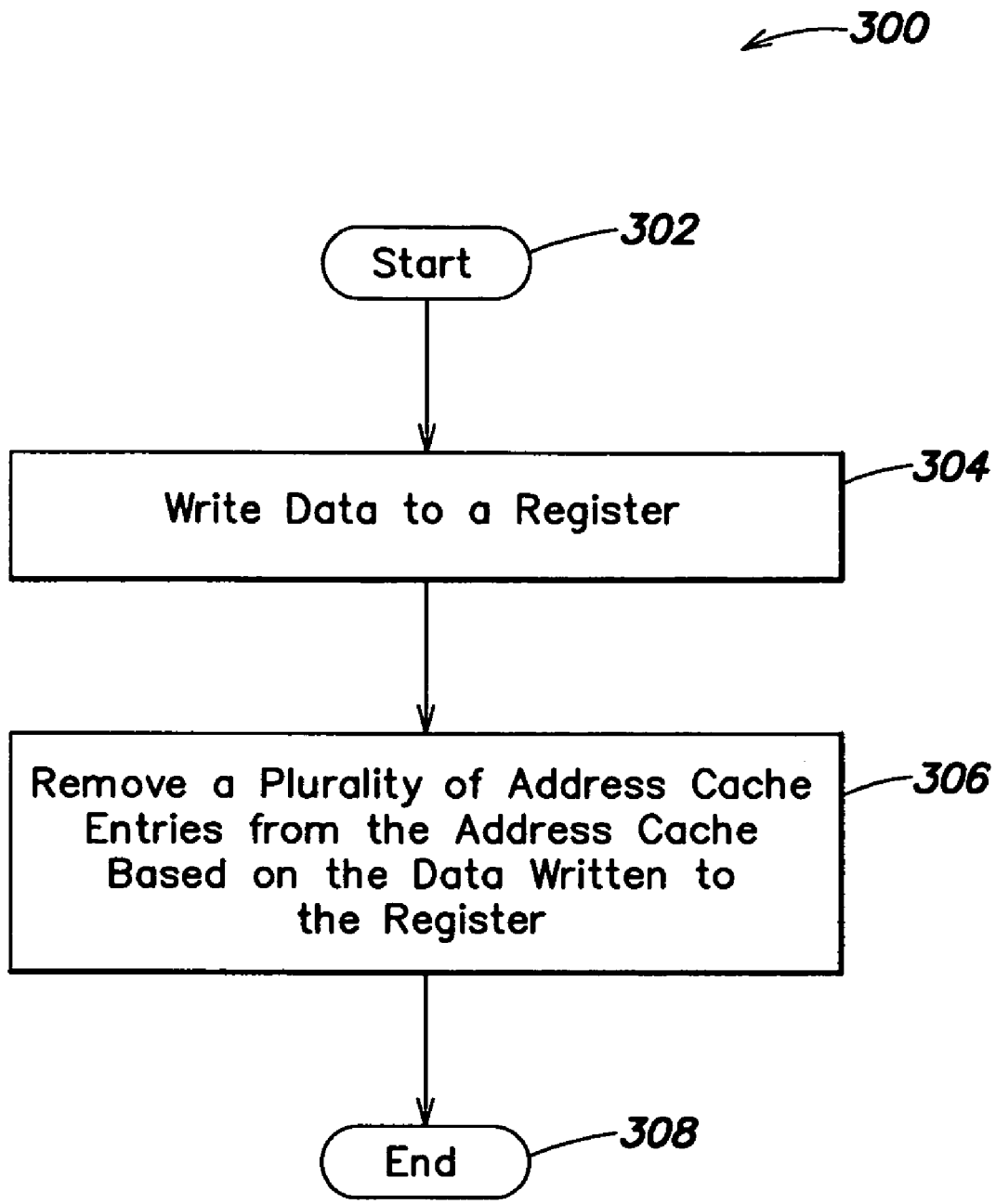
FIG. 3 illustrates a method of removing address cache entries in accordance with an embodiment of the present invention.

Operation of the system for removing address cache entries is now described with reference to FIGS. 1-2 and with reference to FIG. 3 which illustrates a method of removing address cache entries in accordance with an embodiment of the present invention. With reference to FIG. 3, in step 302, the method 300 begins. In step 304, data may be written to a register. For example, the system 100 (e.g., software 104 executed thereby) may write data to the invalidate register 200 of the ACER 120. More specifically, the software 104 may write first data 202, which indicates an address of a first entry to be removed from the address cache 114, to the invalidate register 200. Further, the system 100 (e.g., software 104 executed thereby) may write second data 204, which indicates a number N of entries to be removed from the address cache 114, to the invalidate register 200. Additionally, the system 100 (e.g., software 104 executed thereby) may write third data 206, which indicates a state of the address cache entry removal and thereby serves as an invalidation state bit, to the invalidate register 200. Although a first through third data 202-206 is described above, a larger or smaller amount and/or different data may be written to the invalidate register 200. All three data 202-206 may be written simultaneously as one operation (although the data 202-206 may be written at different times).

For example, after performing an I/O operation, the system 100 may need to remove (e.g., by invalidating) one or more entries from the translation table 112 and/or address cache 114. Therefore, during a first time period (e.g., one or more clock cycles), the system 100 may write the first through third data 202-206 to the invalidate register 200. The third data 206 may indicate (e.g., to the software 104) that removal of one or more address cache entries is pending.

In step 306, a plurality of address cache entries may be removed from the address cache based on the data written to the register. The data written to the invalidate register 200 may initiate a hardware sequence to remove (e.g., by invalidation) address cache entries. More specifically, based on the first through third data 202-206 written to the invalidate register 200, the ACER 120 may remove one or more entries (e.g., by invalidating such entries) from the address cache 114. For example, the first through third data 202-206 written to the invalidate register 200 may indicate two entries (e.g., corresponding to consecutive addresses) are to be removed from the address cache starting with the entry at address 000A and may indicate that removal of one or more address cache entries is pending. Therefore, during a second time period, the ACER 120 may output the first portion of the first data 202 (e.g., the address of the first entry to be removed from the address cache 114) from the invalidate register 200 to the first multiplexer 208. The first portion of the first data 202 may be output from the first multiplexer 208 to the second register 214 and stored therein.

During a third time period, the first portion of the first data 202 may be employed to access one or more entries in the address cache 114. For example, the first portion of the first data 202 may be output from the second register 214 and input by the hashing logic 228. Based on the first portion of the first data 202, the hashing logic 228 may create and output data (e.g., an index), which may be used to access the address cache 114 (e.g., directory array 116 thereof), to the address cache 114. Based on such data, the address cache 114 may output data corresponding to one or more address cache 114 entries. For example, if the address cache 114 is a two-way set-associative cache, data corresponding to two entries may be output from the address cache 114. Similarly, if the address cache 114 is a four-way set-associative cache, data corresponding to four entries may be output from the address cache 114. Data corresponding to an entry may include data indicating an address associated with the entry (e.g., a tag) and data indicating whether the accessed entry is valid (e.g., a valid bit). However, the data corresponding to an entry may include a larger or smaller amount of and/or different data. For example, in some embodiments, data corresponding to an entry may include data indicating whether the accessed entry is one of the "least recently used" (LRU) entries (e.g., an LRU bit).

Data corresponding to entries output from the address cache 114 may be input by the compare logic 234. Further, the second portion of the first data 202 (e.g., a first address) may be output from the invalidate register 200 and input by the compare logic 234. The compare logic 234 may access the valid bit included in the data corresponding to an entry, which is output from the address cache 114. If the valid bit indicates the data corresponding to the entry, and therefore, the entry is valid, the compare logic 234 may compare the data indicating an address associated with such entry (e.g., a tag) with the second portion of the first data 202. If the data matches, the compare logic 234 may update (e.g., write) the valid bit of such address cache entry to indicate that the entry invalid. In this manner, the entry may be removed from the address cache 114. Alternatively, if the data does not match, the compare logic 234 does not update the valid bit of such address cache entry.

Further, during the third time period, the increment logic 218 may update the data 202, which represents a portion of an address, output from the second register 214 to form new data representing a portion of the next address (e.g., 000B). The new data may be input by and output from the first multiplexer 208 and input by and output from the second register 214 during the third time period or a subsequent time period (e.g., a fourth time period). During the subsequent time period, the new data may be employed to access and possibly remove (e.g., by invalidating) one or more entries of the address cache 114 in a manner similar to that described above using the first portion of the first data 202.

Further, during the third time period, to count the number of entries removed from the address cache 114, the invalidate register 200 may output the second data 204, which represents a number of entries to be removed from the address cache 114, to the second multiplexer 254, and the second multiplexer 254 may output the second data 204 to the decrement logic (although such data may be output from the second multiplexer 254 and/or the third register 260 sooner or later). Additionally, the second data 204 may be output from the third register 260 to the invalidation state bit setting logic 272, which may update the third data 206 indicating the status of address cache entry removal based thereon. More specifically, if data output from the third register 260 indicates zero entries are to be removed from the address cache 114, the invalidation state bit setting logic 272 may update the third data 206 to indicate that address cache entry removal is complete.

During the third period (e.g., while the first portion of the first data 202 (e.g., an address) is used to read data from corresponding entries of the address cache 114 and/or write data to corresponding entries of the address cache 114), the decrement logic 264 may decrement the third data 206, which represents the number of entries to be removed from the address cache 114, by one to form a new number of entries to be removed from the address cache 114. The new number of entries to be removed from the address cache 114 may be input by and output from the second multiplexer 254 and input by and output from the third register 260 to the decrement logic 264 and to the invalidation state bit setting logic 272 during the third time period or a subsequent time period (e.g., a fourth time period). During the subsequent time period (e.g., the time period when the new data may be employed to access and possibly remove one or more entries of the address cache 114), the decrement logic 264 may decrement the new number of entries to be removed from the address cache 114 by one as described above.

The above-described process may repeat until the new number of entries to be removed from the address cache 114 received by the invalidation state bit setting logic 272 is a predetermined number (e.g., zero). Once the new number of entries to be removed from the address cache 114 received by the invalidation state bit setting logic 272 is the predetermined number (e.g., zero), the invalidation state bit setting logic 272 may update the third data 206 to indicate address cache entry removal is complete. Consequently, the system 100 (e.g., software 104 executed thereby) may access the third data 206 (e.g., by polling the invalidate register 200) and determine that address cache entry removal is complete.

Thereafter, step 308 is performed. In step 308, the method 300 ends. Through use of the present methods and apparatus, a plurality of entries (e.g., corresponding to consecutive addresses) may be removed from an address cache 114. The system 100 may remove the plurality of entries from the address cache 114 in response to a single instruction. For example, the system 100 (e.g., software 104 executed thereby) may cause a plurality of entries to be removed from the address cache 114 by writing the first through third data 202-206 to the invalidate register 200. In this manner, the present invention may efficiently remove entries from the address cache 114. More specifically, the present methods and apparatus may remove a plurality of entries from the address cache 114 using fewer instructions than conventional systems. In this manner, the present invention may minimize a number of instructions required to remove a plurality of address cache entries. Further, the present methods and apparatus may employ less logic, and therefore require less chip real estate, than conventional systems. Consequently, the present invention may optimize removal of a plurality of entries from the address cache 114.

Once one or more entries are removed from the address cache 114, the system 100 may perform one or more I/O operations. During the I/O operations, the system 100 may access one or more entries of the address cache 114 to perform an I/O address translation. Because the system 100 may not access the address cache 114 until the plurality of entries are removed therefrom, I/O accesses requiring I/O address translation will not access an address cache entry including inaccurate (e.g., old) data.

The foregoing description discloses only exemplary embodiments of the invention. Modifications of the above disclosed apparatus and methods which fall within the scope of the invention will be readily apparent to those of ordinary skill in the art. For instance, in some embodiments, the invalidate register 200 may be a memory-mapped (mmio) register. Reads from and writes to a mmio register may introduce significant delays to system operation. Because the present invention may reduce a number of times the system 100 (e.g., software 104 executed thereby) may write to the invalidate register 200 to remove a plurality of address cache entries, the present invention may reduce and/or eliminate such delays. Consequently, the present invention may provide performance benefits to systems which perform a large number of I/O operations, and therefore, frequently add and/or remove entries from the address cache 114.

The I/O address translation table 112 may be a single-level table or a multiple-level table. For example, the I/O address translation table 112 may be a multiple-level table including an I/O segment table and an I/O page table. In some embodiments (such as the embodiments described above with reference to FIGS. 1-3), it may be assumed that translation occurs on a page (e.g., a 4 KB block of data) basis, and a portion of an I/O address corresponding to a page number may identify an address cache entry for removal (e.g., by invalidation).

In some embodiments, when software 104 attempts to read data from the invalidate register 200 while the third data 206 indicates address cache removal is underway, the ACER 120 may not output data to the software 104. In systems that support asynchronous split transactions, when software 104 reads the invalidate register 200, the ACER logic 120 may not return data until the address cache entry removal is complete. In this manner, the present invention may reduce a number of read operations on the system bus 110.

Further, although the present methods and apparatus are described above with reference to an address cache, the present methods and apparatus may be employed with other types of caches such as a data cache (e.g., to invalidate a plurality of data cache entries). Therefore, the present invention may be helpful to update systems in which data cache invalidation is done with explicit instructions (e.g., software managed cache coherency of a co-processor). Additionally, in some embodiments, an address cache entry may correspond to one of a plurality of pages, each page of which may be one of a plurality of sizes. In this manner, the present methods and apparatus for cache invalidation can be used with multiple page sizes. For example, an I/O address translation table 112 may be a multiple-level table including an I/O segment table and an I/O page table. Each I/O segment table entry may specify a size of pages in the I/O segment, and an I/O page table entry may contain the same number of bytes regardless of the page size. Therefore, consecutive entries in the I/O page table may represent consecutive pages. Consequently, the present methods and apparatus for invalidating consecutive addresses may function correctly regardless of the page size.

Accordingly, while the present invention has been disclosed in connection with exemplary embodiments thereof, it should be understood that other embodiments may fall within the spirit and scope of the invention, as defined by the following claims.

The invention claimed is:

1. A method of removing entries from an address cache, comprising:
  writing data to a register; and
  removing a plurality of address cache entries from the address cache based on the data written to the register, wherein:
    writing data to the register includes writing an address indicating a first address cache entry to be removed from the address cache, a number N of entries to be removed from the address cache and an address cache entry removal status bit to indicate address cache entry removal is underway; and
    removing the plurality of address cache entries from the address cache based on the data written to the register includes removing N entries corresponding to consecutive addresses from the address cache starting with the first address cache entry to be removed.

2. The method of claim 1 further comprising writing the address cache entry removal status bit to indicate address cache entry removal is complete.

3. The method of claim 2 further comprising:
  reading the address cache entry removal status bit to determine address cache entry removal complete; and
  accessing an address cache entry to perform input/output (I/O) address translation.

4. An apparatus for removing entries from an address cache, comprising:
  logic, including a register, adapted to couple to the address cache and further adapted to:
    store data written to the register; and
    remove a plurality of address cache entries from the address cache based on the data written to the register,
  wherein the logic is further adapted to:
    store an address indicating a first address cache entry to be removed from the address cache, a number N of entries to be removed from the address cache and an address cache entry removal status bit to indicate address cache entry removal is underway to the register; and
    remove N entries corresponding to consecutive addresses from the address cache starting with the first address cache entry to be removed.

5. The apparatus of claim 4 wherein the logic is further adapted to store an address cache entry removal status bit that is written to the register to indicate address cache entry removal is complete.

6. A method of removing entries from a data cache, comprising:
  writing data to a register; and
  removing a plurality of data cache entries from the data cache based on the data written to the register,
  wherein:
    writing data to the register includes writing an address indicating a first data cache entry to be removed from the data cache, a number N of entries to be removed from the data cache and an data cache entry removal status bit to indicate data cache entry removal is underway; and
    removing the plurality of data cache entries from the data cache based on the data written to the register includes removing N entries corresponding to consecutive addresses from the data cache starting with the first data cache entry to be removed.

7. The method of claim 6 further comprising writing the data cache entry removal status bit to indicate data cache entry removal is complete.

* * * * *